(12) United States Patent
Horvitz et al.

(10) Patent No.: US 7,647,171 B2
(45) Date of Patent: Jan. 12, 2010

(54) LEARNING, STORING, ANALYZING, AND REASONING ABOUT THE LOSS OF LOCATION-IDENTIFYING SIGNALS

(75) Inventors: Eric I. Horvitz, Kirkland, WA (US); John C. Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 11/171,891

(22) Filed: Jun. 29, 2005

(65) Prior Publication Data
US 2007/0005243 A1  Jan. 4, 2007

(51) Int. Cl.
*G01C 21/00* (2006.01)
(52) U.S. Cl. .................. 701/213; 340/990
(58) Field of Classification Search ........... 701/213, 701/201, 208, 211, 212; 340/995.1, 990; 348/14.07, 42; 345/418–422, 426
See application file for complete search history.

(56) References Cited

U.S. PATENT DOCUMENTS

| | | | |
|---|---|---|---|
| 5,212,430 A | 5/1993 | Jartyn | |
| 5,395,042 A | 3/1995 | Riley et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,903,235 A | 5/1999 | Nichols | |
| 6,321,158 B1 | 11/2001 | DeLorme et al. | |
| 6,353,398 B1 | 3/2002 | Amin et al. | |
| 6,401,085 B1 | 6/2002 | Gershman et al. | |
| 6,453,237 B1 | 9/2002 | Fuchs et al. | |
| 6,466,232 B1 | 10/2002 | Newell et al. | |
| 6,513,046 B1 | 1/2003 | Abbott, III et al. | |
| 6,515,620 B1 | 2/2003 | Jandrell | |

(Continued)

FOREIGN PATENT DOCUMENTS

JP           06289121       * 10/1994

(Continued)

OTHER PUBLICATIONS

Andy Harter, et al., A Distributed Location System for the Active Office, IEEE Network, 1994, pp. 62-70.

(Continued)

*Primary Examiner*—Dalena Tran
(74) *Attorney, Agent, or Firm*—Wolf, Greenfield & Sacks, P.C.

(57) ABSTRACT

A location-centric signal shadow mapping and storing architecture that creates maps where signals, such as GPS, cannot be seen with ease because of natural or synthetic features such as groups of tall buildings. Such maps are used with other information, such as the dynamics of the sensed velocity that had been seen before the loss of the signals, to reason about the location and likely activities being carried out by one or more people. Inferences can be made based on information about organizations and services associated with structures and locations proximal to the locations where signals were lost. Also, such reasoning can be used to turn off or to reduce the power consumed by the receivers of the location information, potentially with the joint use of accelerometers to identify when significant accelerations occur.

20 Claims, 10 Drawing Sheets

U.S. PATENT DOCUMENTS

| | | | |
|---|---|---|---|
| 6,549,915 | B2 | 4/2003 | Abbott, III et al. |
| 6,615,186 | B1 | 9/2003 | Kolls |
| 6,675,081 | B2 | 1/2004 | Shuman et al. |
| 6,735,557 | B1 * | 5/2004 | Castellar et al. ................ 703/5 |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,816,686 | B2 | 11/2004 | Hooper et al. |
| 6,842,877 | B2 | 1/2005 | Robarts et al. |
| 6,844,827 | B2 | 1/2005 | Flick |
| 6,850,252 | B1 | 2/2005 | Hoffberg |
| 6,868,325 | B2 | 3/2005 | Menon et al. |
| 6,954,657 | B2 | 10/2005 | Bork et al. |
| 7,027,773 | B1 | 4/2006 | McMillin |
| 7,053,826 | B1 | 5/2006 | McBurney et al. |
| 7,117,087 | B2 * | 10/2006 | Jung et al. ................ 701/213 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0070602 | A1 | 4/2004 | Kobuya et al. |
| 2005/0034078 | A1 | 2/2005 | Abbott et al. |
| 2005/0125295 | A1 | 6/2005 | Tidwell et al. |
| 2007/0299605 | A1 * | 12/2007 | Onishi et al. ................ 701/208 |

FOREIGN PATENT DOCUMENTS

| | | | |
|---|---|---|---|
| JP | 2007051878 | * | 3/2007 |
| WO | 9800787 | | 1/1998 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Dissemintationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Fred Collins, A Comparison of Spatial Interpolation Techniques in Temperature Estimation, Third International Conference/Workshop on Integrating GIS and Environmental Modeling, Santa Fe, 1996, 11 pages.

Jason L. Williams, Gaussian Mixture Reduction for Tracking Multiple Maneuvering Targets in Clutter, Thesis, Air Force Institute of Technology, AFIT/GE/ENG/03-19, Wright-Patterson Air Force Base, Ohio, 2003, 247 pages.

John Krumm, TempIO: Inside/Outside Classification with Temperature, The Second International Workshop on Man-Machine Symbiotic Systems, Nov. 23-24, 2004, Kyoto, Japan, pp. 241-250.

NOAA, METAR Data Access. Available at http://weather.noaa.gov/weather/metar.shtml, last accessed on Jul. 19, 2005, 3 pages.

NOAA, Local Climatological Data Publication. Available at: http://nndc.noaa.gov/?http://ols.nndo.noaa.gov/plolstore/plsql/olstore.prodspecific?prodnum=C00128-PUB-S0001, Last accessed on Jul. 19, 2005, 2 pages.

* cited by examiner

FIG. 6

LEARNING, STORING, ANALYZING, AND REASONING ABOUT THE LOSS OF LOCATION-IDENTIFYING SIGNALS

CROSS-REFERENCE TO RELATED APPLICATIONS

This application is related to pending U.S. patent application Ser. No. 11/172,474 entitled "INTEGRATION OF LOCATION LOGS, GPS SIGNALS, AND SPATIAL RESOURCES FOR IDENTIFYING USER ACTIVITIES, GOALS, AND CONTEXT" filed on Jun. 30, 2005.

BACKGROUND

As computing moves off the desktop into the hands of mobile users, it is becoming ever important for mobile devices to be aware of the user context. Important pieces of context include user's location, activities, nearby people and devices, and mode of transportation, if any. This knowledge can in turn be employed by mobile devices to display reminders, to configure themselves for use with other devices, and to behave in a manner that is appropriate for the surrounding environment (e.g., turn off cell phone ringer) or subcontexts of the surrounding environment such as whether particular states or transitions among states are occurring within the environment.

One aspect of context concerns whether or not the user (and the device) is inside or outside of a building or structure. For example, knowledge of such information can be used to facilitate determining the user's location (e.g., in a building or structure, in a particular building or structure, or in one of a set of known buildings or structures) and the user's mode of transportation (e.g., in a bus, car or airplane). Such knowledge can also be utilized to conserve power on systems that do not provide useful services inside buildings or outside.

Another aspect of the relevance of the loss of signals to a user's context and activities is related to a larger scale, that is, "urban canyons"—where GPS reception is poor because of surrounding structures. The loss of signals when a user moves from an area where signals are known to be receivable into an area where signals are known to be hard to receive can provide knowledge of where the user has traveled, currently is, and is potentially heading in an urban canyon. Urban canyons can be created by structures such as multi-story buildings (principally, and whether the user is inside or outside of the building), but also include trees, hills, and tunnels (generally). Knowledge of where GPS signals are lost can be of value to the user and to companies that seek to benefit economically by knowledge of the user location. To date, the loss of GPS signals or "GPS shadows" caused by structures has been considered a nuisance and deficiency. The GPS shadows are areas where a terrestrial receiver (e.g., a handheld receiving device) cannot receive adequate GPS signals due to signal blockage or degradation by any of the aforementioned structures (buildings, bridges, trees, hills, tunnels, etc.). There are currently unrealized benefits that can be obtained from the knowledge of shadow information and locations.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

This invention pertains to reasoning about the loss of signals as a valuable complement to reasoning about signals that provide information about the location of an object or person. In one example, focus is on the loss of GPS signals, but the loss of "GPS" signals or detection of "GPS shadows" can be taken to mean the loss of GPS or any other location-centric signals, such as IEEE 802.11 WiFi signals, GSM (global system for mobile communications) signals, commercial broadcast signals, and even the loss of the signaling infrastructure used by a device to communicate with a central server or another monitoring system via one or more signaling modalities.

The detection of the loss of signals carries with it potentially valuable information about a user's activities and location. The loss of signals also indicates that particular modalities or usages may become irrelevant. For example, GPS typically fails to operate inside buildings because satellite signals are significantly attenuated inside buildings. Thus, determination of the likelihood that a user is inside can be used to turn off a power-consuming GPS system or put the system into a mode where it probes for satellite signals periodically at a static or variable rate with the changing of the likelihood so as to conserve the batteries of the GPS system.

The invention disclosed and claimed herein, in one aspect thereof, comprises a shadow mapping architecture that maps communications shadows (e.g., GPS shadows) associated with structures at various geographic locations. This is beneficial in the context of urban canyons where there is a high incidence of shadows affecting the communications of user devices (e.g., cell phones, and PDAs). The invention includes a shadow processing component that processes location information received from a wireless receiving device, and a shadow analysis component that generates a shadow map of shadows in the locations or areas.

In yet another aspect thereof, a machine learning and reasoning component is provided that employs a probabilistic and/or statistical-based analysis to prognose or infer an action that a user desires to be automatically performed. In still another aspect of the invention, a logic-centric policy component is provided for the generation and/or processing of rules or policies. With respect to another feature, a shadow mapping subsystem disposed as a network node can be employed that stores shadow information to be utilized for learning, processing, analyzing and storing shadow information.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 6 illustrates an exemplary shadow mapping data store table.

DETAILED DESCRIPTION

Figure 1:
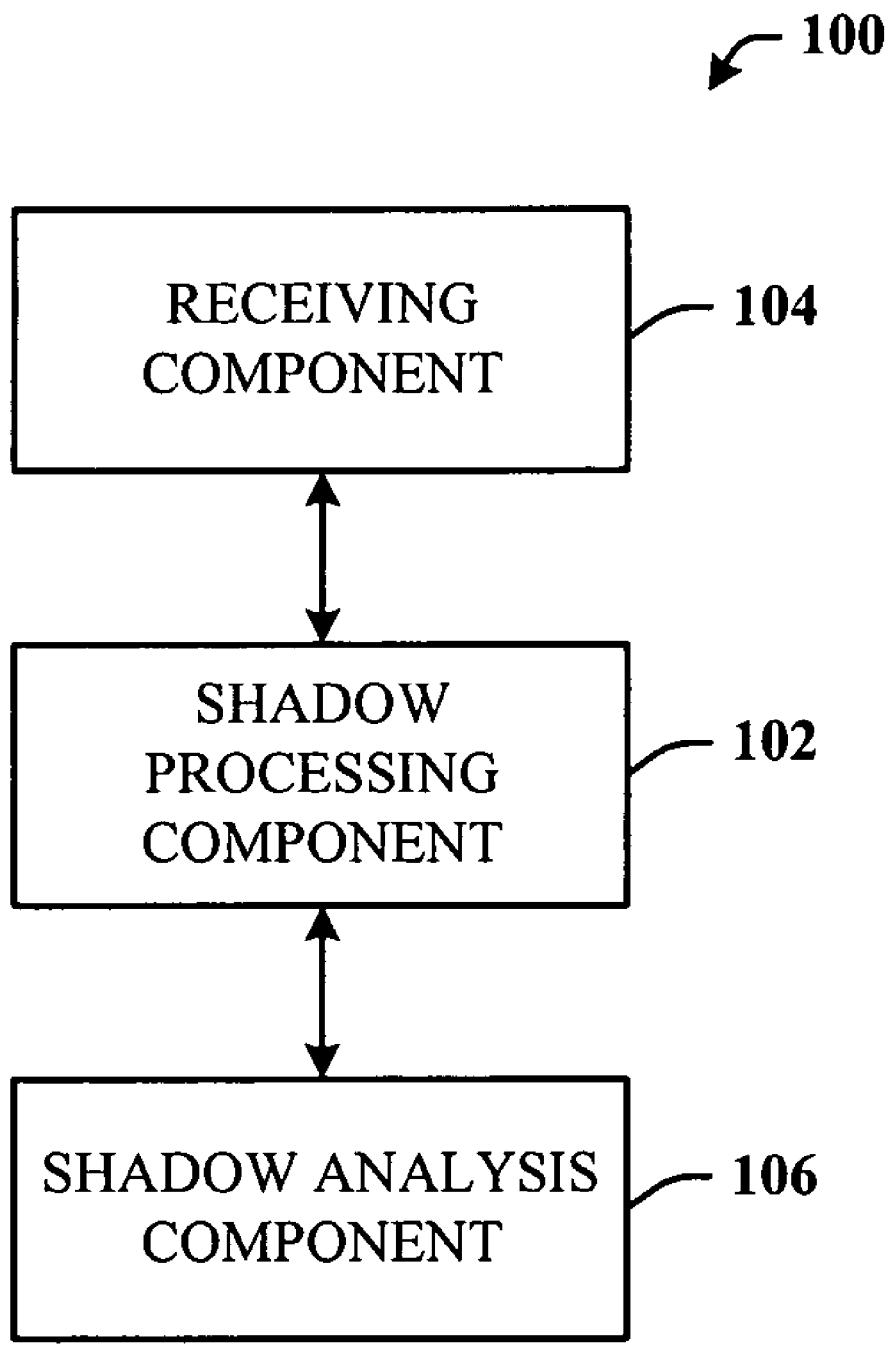
FIG. 1 illustrates a shadow processing system.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a shadow processing system 100 in accordance with the subject innovation. The system 100 includes a shadow processing component 102 that facilitates reception of geographic location signals from a receiving component 104, which can be a portable wireless device (e.g., a cell phone, PDA, or the like) that includes the capability of receiving and processing at least such geographic location signals. It is to be appreciated, however, that the receiving component 104 can be any suitable wired/wireless receiving device or system capable of receiving and processing geographic location signals in accordance with the embodiments described herein.

In one implementation, the geographic location signals can be of a GPS. Currently, GPS consists of a constellation of twenty-four satellites each in its own orbit approximately 11,000 miles above the earth—each of the satellites orbits the earth in about twelve hours, and the positions of which are monitored by ground stations. The satellites each include atomic clocks for extremely accurate timing (e.g., within three nanoseconds of each other) that provides the capability to locate the receiver on the earth within, in some applications, one meter resolution. When receiving geographic location signals from several of the GPS satellites, the receiving component 102 can calculate the distance to each satellite of the communicating satellites and then calculate its own position, on or above the surface of the earth. However, when the signals are interrupted or degraded due to terrestrial structures, such interrupt time and position information can be useful in mapping GPS shadows. A shadow is an area of communications interruption or total blockage. In the context of GPS, shadows are areas where a terrestrial receiver (e.g., a handheld receiving device) cannot receive adequate GPS signals due to signal blockage or degradation by any of many types of structures that include buildings, bridges, trees, hills, water (when submerged) and tunnels, for example.

The system 100 also includes a shadow analysis component 106 that analyzes the GPS location information and processes the analyzed information in order to develop and store GPS shadow information. As described infra, the data can be stored in the form of tables accessible as a network node. The GPS location information can be received from the receiving component 104 via, for example, wireless assisted GPS (WAGPS). WAGPS facilitates the transmission of the GPS location information from the receiving component 104 to a remote location such as the shadow processing component 102. Generally, this can occur through a cellular network (not shown) where the receiving component 104 is a cellular telephone, to an IP network (not shown) (e.g., the Internet), and terminating at the shadow processing component 102 as a node on the Internet or on a subnet thereof.

Given the approximate location of the receiving component 104 and the time at which the GPS shadow is entered and departed, and the velocity at which a user was seen to enter a shadow can be mapped at least according to some characteristics such as to a leading edge (when the device enters the shadow and loses signal) and trailing edge (the device leaves the shadow and again reacquires suitable GPS signals). Such basic information can be analyzed and processed to generalize on a shadow at that location, and in association with a structure. Receiving such information from a plurality of WAGPS devices over time provides more data points in which to define desired characteristics of the shadow. Thus, in accordance with the invention, a data store of shadow maps can be generated and stored in association with structures of urban canyons, for example. Once the shadow maps are defined, then a substantial amount of information can be obtained and analyzed with respect to the user of the WAGPS device such as activities, intentions, direction of travel, advertising and reminders that can be presented in anticipation of user travel, and so on. The personal and economic benefits to uses of such information are significant.

Figure 2:
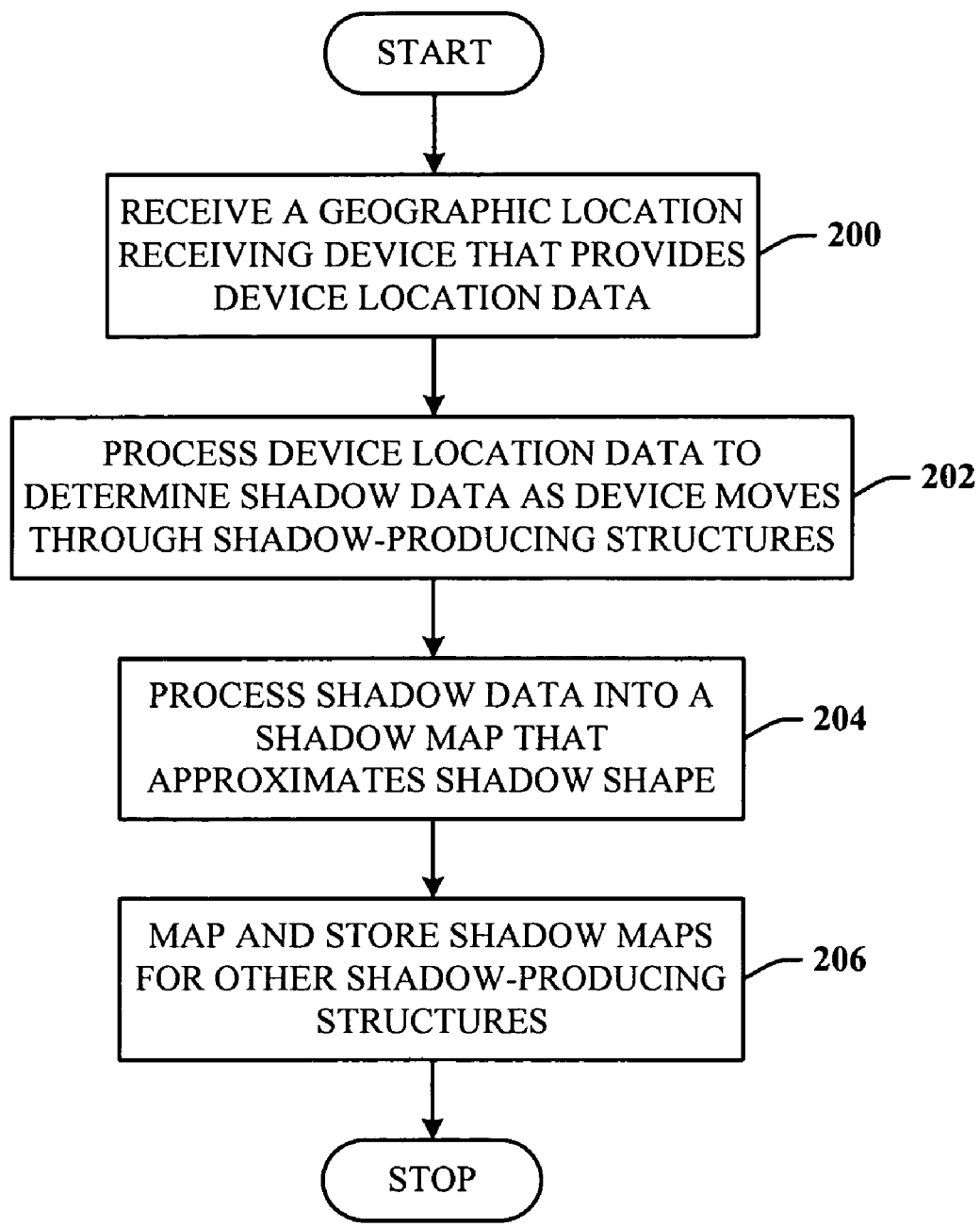
FIG. 2 illustrates a methodology of shadow mapping.

FIG. 2 illustrates a methodology of shadow mapping. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a receiving device is provided that is capable of receiving and processing device location information. At 202, the device location information is processed to determine shadow data as the device moves through shadow-producing structures (e.g., buildings in an urban canyon). At 204, the received device location data is analyzed and processed along with other data (e.g., temporal data) to generalize on the structure (or shape) of the shadow to form a shadow map. At 206, map and store shadow maps for other shadow-producing structures.

Figure 3:
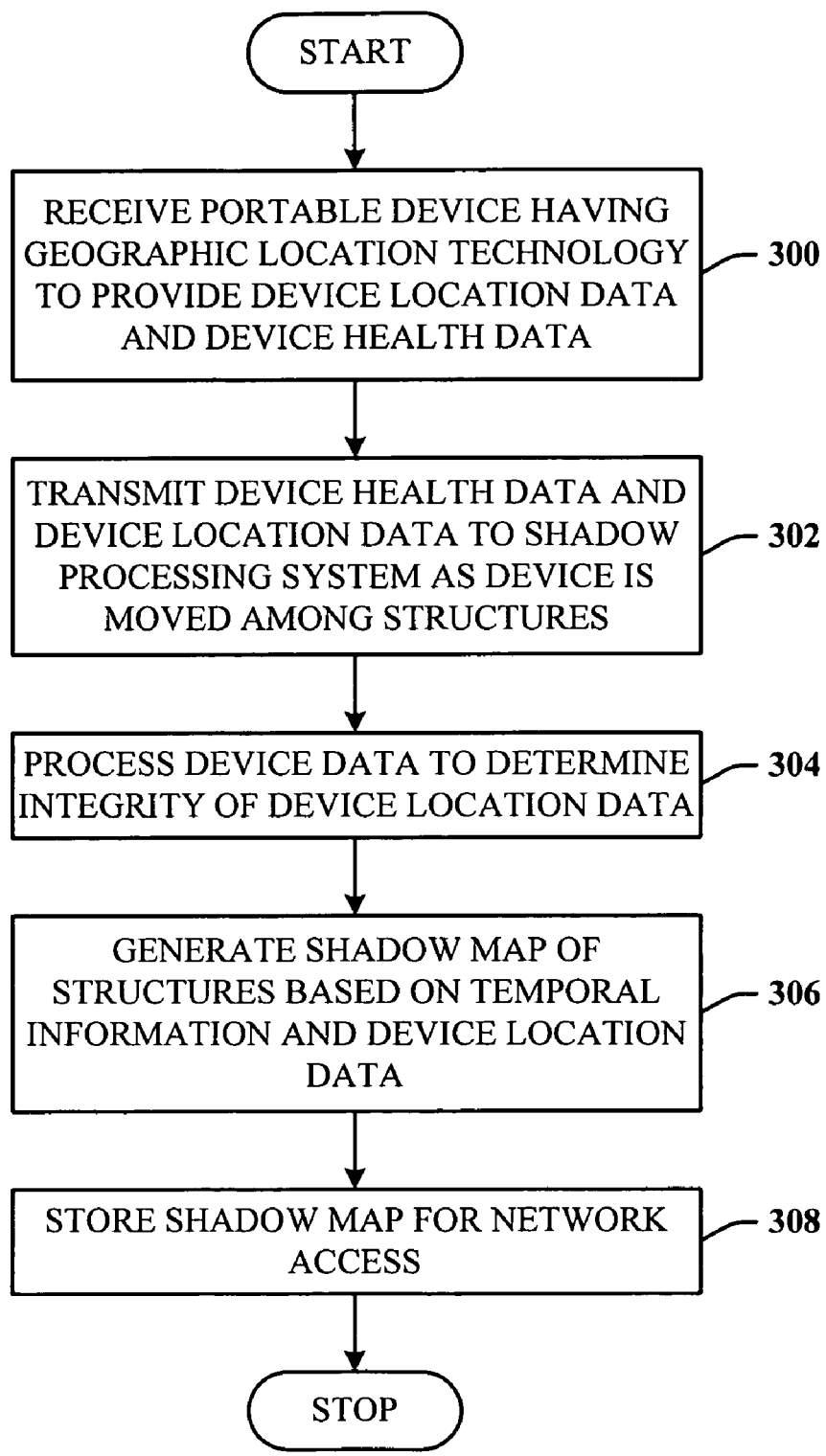
FIG. 3 illustrates a methodology of shadow mapping by utilizing device information.

Referring now to FIG. 3, there is illustrated a methodology of shadow mapping by utilizing device information. At 300, a wireless portable device is received that includes geographic location technology (e.g., GPS) to provide device location data and device health data. At 302, device health data and device location data is transmitted as the device moves among structures that cause communications shadows. At 304, the device health data is processed to determine the integrity of the device location data. At 306, a shadow map of the structures is generated based on temporal information and the device location data. At 308, the shadow map is stored with other related information for access.

Figure 4:
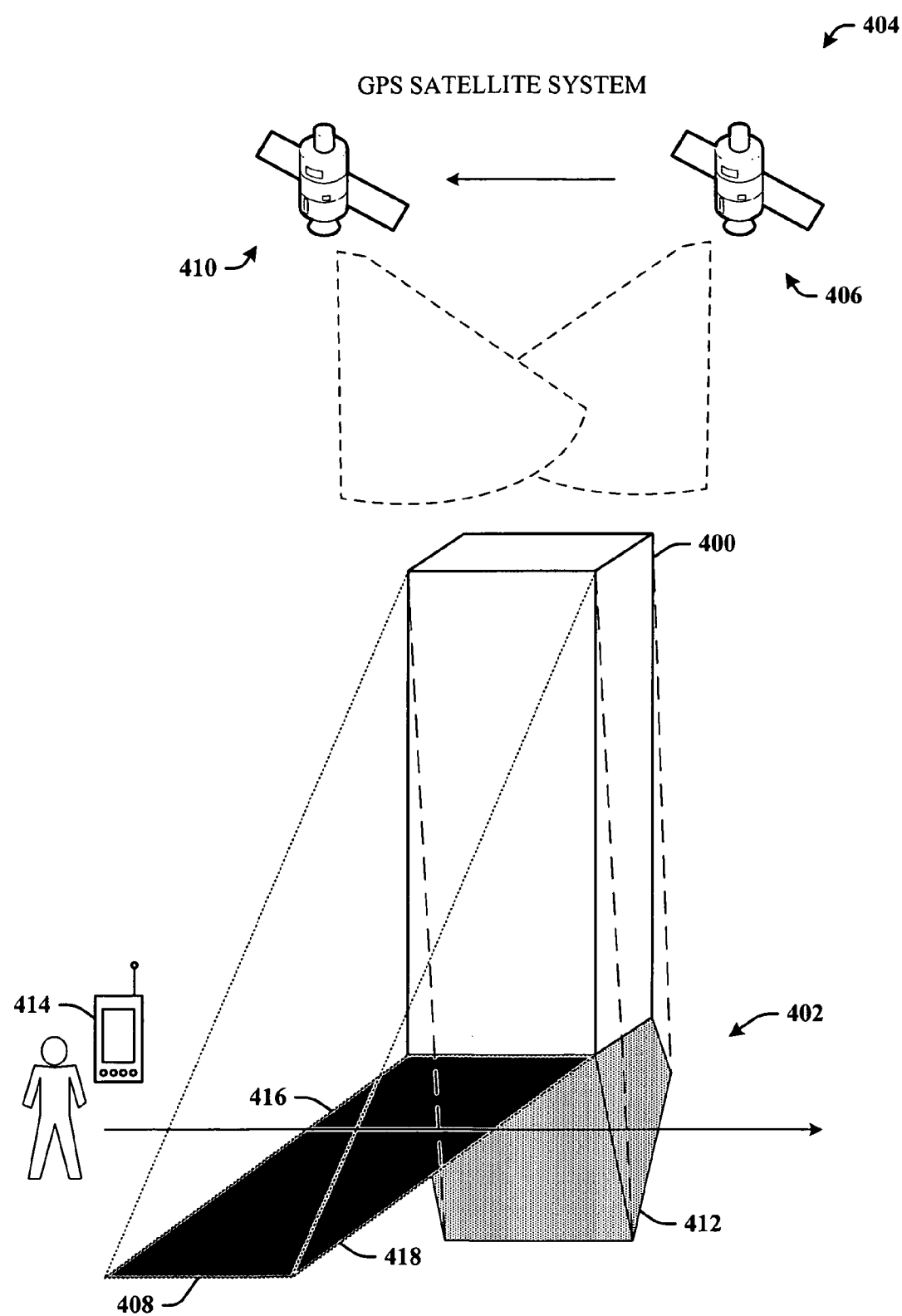
FIG. 4 illustrates a diagram of GPS shadow movement and mapping.

FIG. 4 illustrates a diagram of GPS shadow movement and mapping. A structure 400 (e.g., a building) is provided that causes a GPS shadow 402 in relation to a GPS satellite system 404 that orbits the earth twice per day. In that the satellite system 404 moves in relation to the earth, and thus, in relation to the structure 400, the shadow 402 will move accordingly to some extent based on signal coverage of the multi-satellite GPS system 404. In other words, when the satellite system 404 is in a first position 406, a first position shadow 408 of a shape and size can be cast on the earth's surface by the structure 400. Similarly, when the satellite system 404 is in a different position 410, a corresponding second position shadow 412 can be cast on the earth's surface, and which can be of a different shape and size than the first position shadow 408.

It is to be appreciated that the size of the shadow 402 as ultimately mapped will change according to the speed and direction of a WAGPS device 406 moving through the shadow 402. In other words, moving the device 414 in a direction substantially perpendicular through the first position shadow 408 will result in a more accurate determination of a leading edge 416 and trailing edge 418 of the first position shadow 408 at a given time. Thus, the shadow mapping process can occur incrementally such that phases of the shadow 402 are mapped over short durations of time and stored accordingly. Thereafter, some or all of the mapped phases can be combined to provide comprehensive shadow map for the structure 400 over a longer duration of time.

Figure 5:
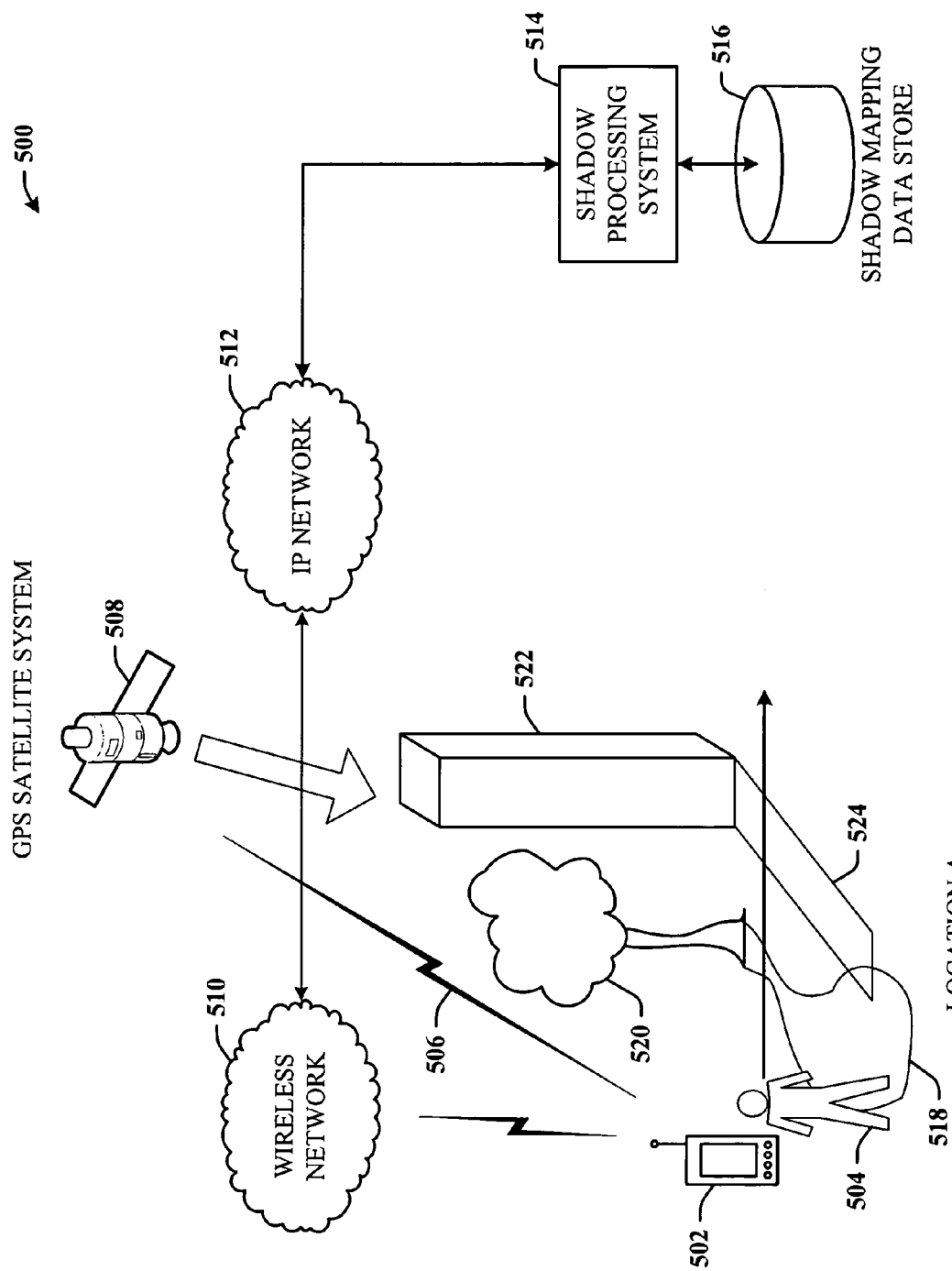
FIG. 5 illustrates a diagram of a system that facilitates shadow mapping.

FIG. 5 illustrates a diagram of a system 500 that facilitates shadow mapping. A wireless device 502 of a user 504 receives geographic location signals 506 from a satellite system 508 (e.g., GPS). The device 502 processes the geographic location signals 504 in order to determine its location. Additionally, the device 502 is capable of communicating with a wireless network 510 (e.g., a cellular network) such that device location data can be transmitted from the device 502 to the wireless network 510. An IP network 512 (e.g., the Internet) connects to the wireless network 510 to provide IP services accessible thereon. The device location data can be communicated over the IP network 512 to a shadow processing system 514 that learns, processes, analyzes, and stores data that facilitates defining shadow maps. Such information is stored on a shadow mapping data store 516.

As described supra, the device 502 can also process and transmit device data that indicates a status of the device. For example, when the device 502 is moved from a non-shadow area where the device location data can be determined into a GPS shadow 518 such that GPS signals can no longer be received at a suitable level, the change can be determined to be an edge of the GPS shadow 518. However, it is to be appreciated that the loss of GPS signals 506 can also be from device failure, for example. Thus, device information can also be transmitted that confirms whether the change is valid or not. If the device 502 sends device data that indicated the device 502 if fully operational, the change can be considered to be reliable, and stored as a shadow edge.

Alternatively, if no device data is received with the device location data, then the change can be inferred likely be unreliable, since the device may have failed or become unreliable in some way. Thus, as the user 504 moves the device 502 in and out of the shadow 518, the shadow 518 can be mapped to some extent. Greater shadow features can be determined and mapped as more devices 506 are moved into and out the shadow 518. Over time, based on repeated measurements of the structure shadow 518, the shadow features (e.g., shape and size) can be mapped with a higher degree of accuracy.

In an urban canyon, structures are likely to be more closely situated. For example, a tree 520 (or other shadow-producing structure that causes the shadow 518) is likely to be in close proximity to other shadow-producing structures such as a second structure 522 (e.g., a building) that casts a second shadow 524. As a result, the communications shadows (518 and 524) can exhibit some overlap. When ultimately mapped, the map of the two shadows (518 and 524) for the two structures (520 and 522) can be learned, analyzed, processed and stored to be a single map.

With respect to velocity, for example, the loss of the reported GPS signal when the device was seen to be traveling at 65 miles per hour, in conjunction with information that the device is working fine and has battery power, etc., provides evidence that the loss of a signal was probably not because of a user stopping within a structure associated with a specific economic activity, like purchasing an item at a retail business. Instead, it probably means that a user has entered an urban canyon. Seeing a drop in velocity to a stop or near stop before a signal is lost is evidence that a user is probably stopping at a location to perform an activity.

The location can be correlated with a map of location-based resources to identify the type of activity that the user is engaged in—and the return of the signal, coupled with an accelerating velocity away from the location is evidence that the activity associated with the location—and structure, which caused the blockage of the signal, has ended.

Inferences can be made about the probability of different activities, given the pattern of approach into the lost-signal situation, and about the information gleaned about the location associated with the loss of GPS signals. For example, a probability distribution over activities can be associated with the identified type of business or organization associated with the structure. The type of organization can be determined by linking the address or location to type of organization via a lookup in an online yellow pages or via general search on addresses on the Web. The activities can be considered to be continuing while the signal remains lost, and can be considered to have shifted or ended when GPS is re-attained.

In many cases, GPS might be turned off until there are signs of fast accelerations as might be detected by a less-power hungry accelerometer. That is, if a signal is lost for a significant amount of time shortly after the velocity of a user is seen to decelerate from 60 miles per hour to 40 to 30 to 10 to 5 to 2 miles per hour, and there is no knowledge of a GPS shadow in this region, per a previously assembled "GPS shadow map", then there is a good evidence that a user has approached the building with a vehicle capable of going 60 miles per hour, and the user or user and vehicle is currently inside a building. The GPS system can be turned off, to save power, and only turn it on again if there is a sign, perhaps coming from an accelerometer that the user has accelerated significantly, for example, the kinds of accelerations that would only be seen in an automobile. At this time, the GPS can be turned back on again and when the GPS signal detected again, make inferences that the user has left the structure, and that the probability distribution over the activities associated with the structure is changing to a probability distribution associated with driving to another location.

The shadow mapping processing system 514 and associated store 516 can be employed for mapping and storing up known shadows by many users or devices that establish a shadow map, for example. With respect to using a shadow map in real time, for example, it can be inferred that a user who enters a known shadow while traveling on a highway at 70 mph, is likely going to appear at the place where the highway intersects with the shadow in the direction that the user is heading. In contrast, a user whose reported GPS signal is lost (e.g., as monitored by a service that is receiving a live feed of intermittent updates about the GPS information) after that user has significantly slowed down to "parking" or "building parking structure entry" speeds or frankly stopping, is probably doing something associated with the location (e.g., park) or structure (e.g., a shopping mall), until the GPS appears again, at which time the activity is probably now completed. The loss of a signal in the latter case coupled with knowledge that there are no GPS shadows in the area, and also potentially, where it is received via some standard signal and encoding, that the device is radioing back via a web service, that tells the server that it has power and is healthy, but cannot see GPS.

Figure 6:
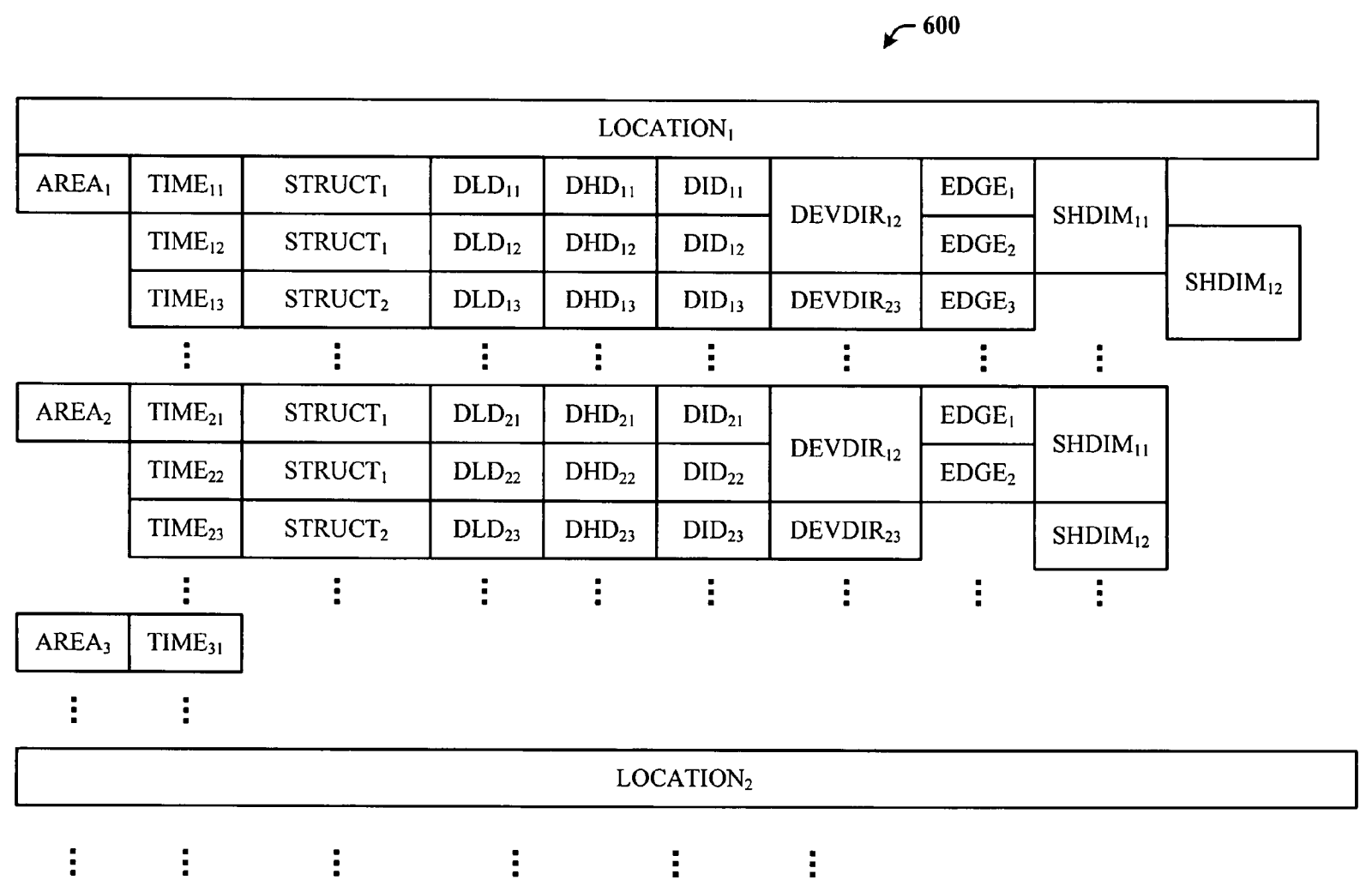

Referring now to FIG. 6, there is illustrated an exemplary shadow mapping data store table 600. Various levels of categorization can be utilized to learn, track and store data related to the acquisition and processing of at least device information, device location information, and shadow information. In the context of an urban canyon, for example, the table 600 can include generalized location information of a first location (denoted $LOCATION_1$) to be mapped, such as a city, county, or block, etc. Associated with the first location is a first area (denoted $AREA_1$) that further defines an area within the first location that is mapped. In this example, the first area can be a cross street. Within the first area can be a number of different shadow-producing structures (denoted $STRUCT_1$, $STRUCT_2$, . . . ), which include any structures (e.g., buildings, trees, bridges, tunnels and mountains) that cause a communications shadow, in this case, a GPS shadow, and which are desired to be mapped.

Associated with the first structure (denoted $STRUCT_1$) is other data such as the time (denoted $TIME_{11}$) that device location data (denoted $DLD_{11}$) was transmitted (or received) from a wireless device that traversed a first shadow edge (denoted $EDGE_1$). Other device information that can be associated with the first area is device health data (denoted $DHD_{11}$) that confirms operation status of the wireless device, device identity data (denoted $DID_{11}$) that uniquely identifies the device from which information is being received, and device direction data (denoted $DEVDIR_{12}$) that is computed from at least two device location data points (e.g., $DLD_{11}$ and $DLD_{12}$) to determine the direction in which the device (and device user) is traveling. In the context of determining GPS shadows from the presence or absence of suitable GPS signals as the device transitions from the presence of GPS signals to no signals, and from the absence of signals to the reception of GPS signals.

The subject invention can then determine general dimensions of a GPS shadow associated with the first structure of the first area of the first location. For example, the combination of no device location information but good device health information can be used to determine the first edge of the shadow. In this case, when no device location data is received, the last instance of valid device location data can be used to compute the edge of the shadow. In one implementation, various mathematical techniques can be used to interpolate, average, find the mean, etc., for the final device location data that will be employed in the table for shadow determination. Furthermore, knowing the time and locations of the device, the approximate speed and direction of the device can be computed.

When large amounts of shadow edge data begin to accumulate, it then becomes possible to develop a mapping of the shadow, based at least in part on edge data. At a minimum, knowing 2-3 edge data points can provide a basis for a generalized shadow map (denoted $SHDIM_{11}$) of the associated first structure. Similar data is obtained and stored in the table 600 for other areas ($AREA_2$, $AREA_3$, . . . ) of the first location, a second location (denoted $LOCATION_2$), etc. It should be appreciated that the table 600 can include many more fields of data or different fields of data other than that which are shown. Additionally, more data can be associated with the first structure then is shown. For example, additional time data can be obtained and stored.

Figure 7:
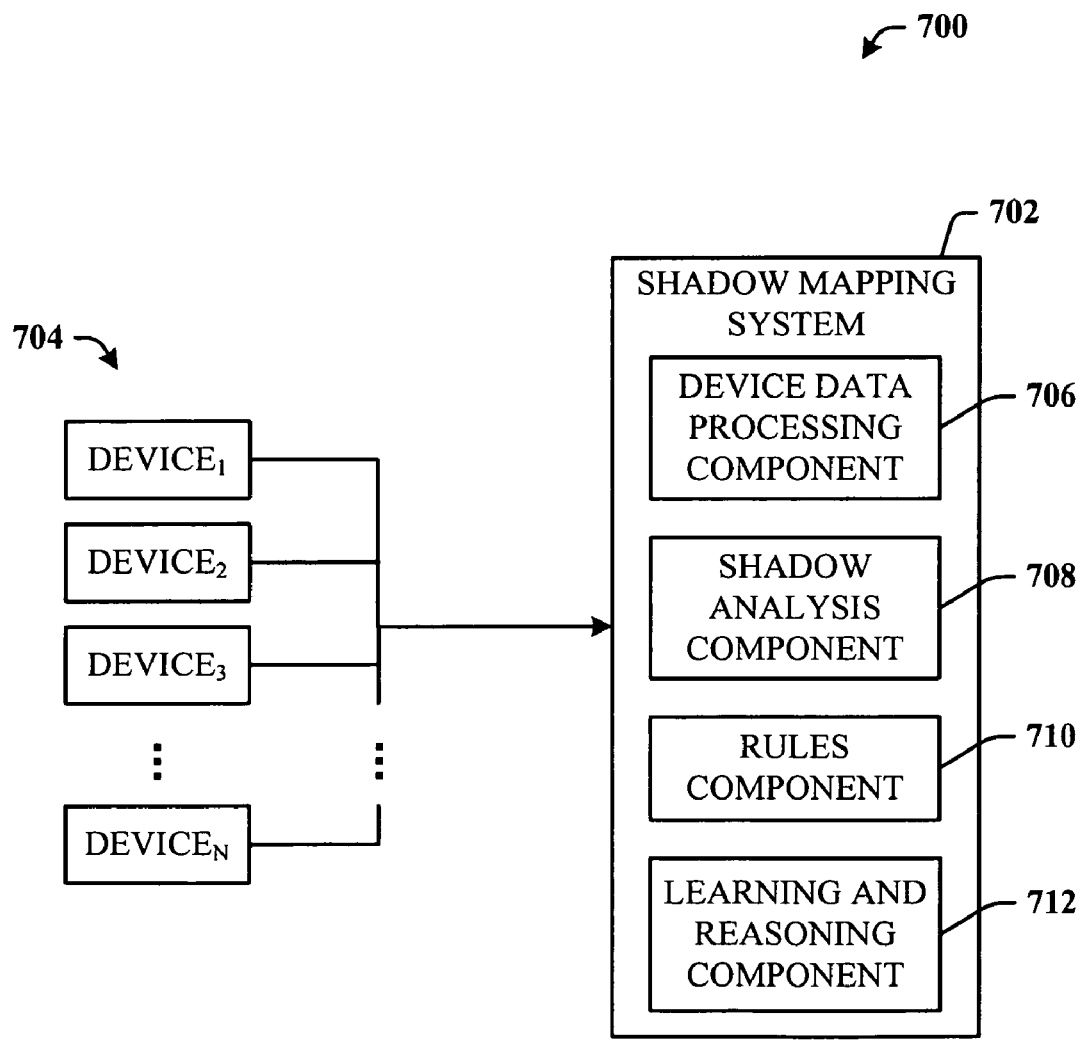
FIG. 7 illustrates a system that employs learning and reasoning which facilitates automating one or more features.

FIG. 7 illustrates a system 700 that employs a machine learning and reasoning component 712 which facilitates automating one or more features in accordance with the subject invention. The system 700 includes a shadow mapping subsystem 702 that is suitably designed to receive, learn, analyze and process data received from a plurality of wireless devices 704 (depicted as $DEVICE_1$, $DEVICE_2$, $DEVICE_3$, . . . , $DEVICE_N$) that are used as front end devices for mapping communications shadows (e.g., GPS shadows). Such devices 704 are typically cell phones, PDAs, and other mobile wireless communications devices that can employ GPS technology.

The shadow mapping subsystem 702 can include a device data processing component 706 that processes received device data (e.g., device health data and device location data) for device interrogation and storage, for example. A shadow analysis component 708 of the subsystem 702 facilitates analysis processing according to any number of algorithms that the system user chooses to employ. The subsystem 702 can also employ a rules component 710 that for allows the implementation and processing of rules (or policies) when processing data received from the plurality of devices 704. For example, a rule (or policy) can be if the device is outdoors AND receiving GPS signals AND the device is operational, then the device is not in a GPS shadow. Similarly, another rule (or policy) can be if the device is outdoors AND not receiving GPS signals AND the device is operational, then the device is in a GPS shadow. Still further, another rule (or policy) can be if the device is outdoors AND receiving GPS signals AND the device is not healthy, then the data received from the device may not be reliable.

The subject invention (e.g., in connection with selection) can employ various AI-based schemes for carrying out various aspects thereof. In furtherance thereof, the subsystem 702 can employ the learning and reasoning component 712 that at least learns and automates one or more features of the shadow mapping process. For example, a process for determining when to accept device data as reliable can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions.

These functions include but are not limited to determining according to predetermined criteria what location the system is currently mapping. For example, without knowing beforehand the precise location from which data is being received, the system analyzes device location data and compares such information with a known mapping of locations and infers a location that will be mapped according to such inference. Moreover, the subsystem 702 can provide some level of confidence that the selected location is correct. Additionally, the learning and reasoning component 712 can further facilitate selection of areas within the location, and still further, shadow-producing structures therein that are associated with GPS shadows. Thus, the subsystem 702 learns from received data, analyzes the data, and stores the data for later processing and access.

In another implementation, the subsystem 702 accesses an Internet-based server that provides location information that can be processed to determine whether the received device location data meets or approximates location information stored thereon. If so, geographic maps can be retrieved and processed for structures that can produce communications shadows. The structures can then be processed and analyzed against the device location data to approximate the structure associated with the detected shadow.

The learning and reasoning component 712, in communication with the other components (706, 708, and 710), can facilitate the automatic generation of rules based on analyzed, processed, and learned data. For example, after receiving large amounts of data for development of a given GPS shadow, rules can be generated that are used for processing and analysis of new data that is received. Thus, trends can be developed, and historical information analyzed over time to update or provide new rules. In another example, rules can be developed and updated by analyzing device location data and device health data from multiple devices and computed device direction data of the multiple devices in the same or general area of a shadow that is being mapped. Such information can be processed to determine a number of parameters that can further define the dimensions of a shadow at a given time of day.

As can be seen, many pieces of information can be processed, analyzed, and stored for shadow mapping in accordance with the subject invention. Additional information can be obtained and analyzed such as temperature at the location that is being mapped, weather conditions, time of year (e.g., holiday), the user and associated user preferences of the identified device, etc., all of which can be used for the personal and corporate economic benefits. For example, developing knowledge of where a shadow is located and the general dimensions of shadows in relation to known structures can then facilitate providing services that forecast shadows for those locations that are yet to be mapped or perhaps cannot effectively or easily be mapped.

Figure 8:
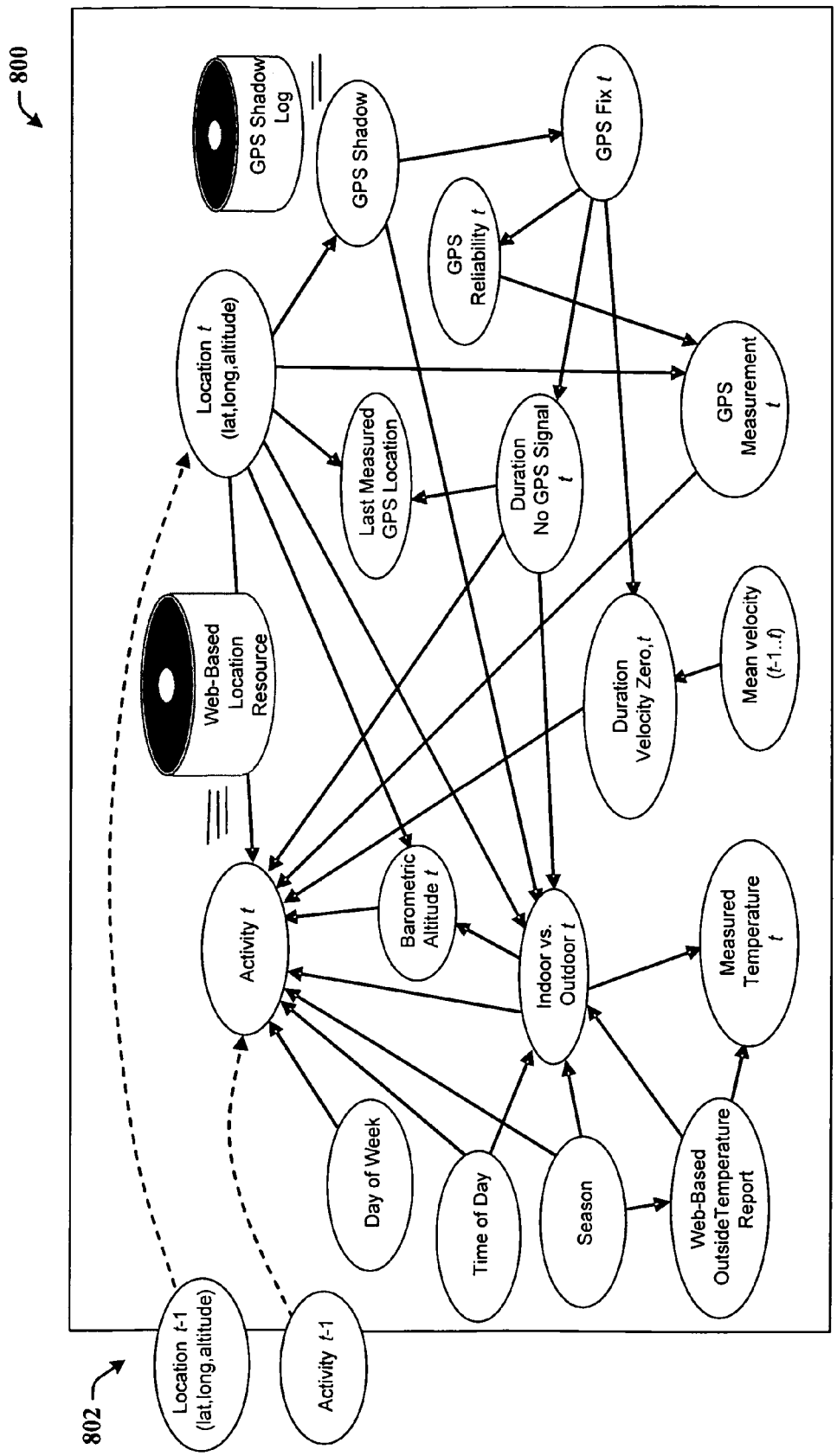
FIG. 8 illustrates another but more detailed dynamic Bayesian network for inferring location and activity, employing Web-based location resources.

FIG. 8 illustrates another but more detailed dynamic Bayesian network 800 for inferring location and activity, employing Web-based location resources. The probabilistic dependencies among random variables highlight the influences of multiple sources of contextual evidence on the probability distribution over activities and location. Web-based location resources provide evidential updates about activities. The model considers variables representing the likelihood that a user is indoors versus outdoors as a function of multiple variables including differences in temperature indoors and outdoors, GPS fix, and a log of known GPS shadows. Multiple variables also update the probability distribution over the current location as a function of multiple sources of information.

Semantic content associated with locations on the Web can provide rich sources of evidence about users' activities over time. General probabilistic models can be provided with the capability to fuse multiple sources of information. Such models can be used to perform inferences about a user's activities from the historical and short-term geographic location data (e.g., GPS), as well as extended sensing with such information as temperature, barometric pressure, ambient light and sound, and Web data. Web content can be used to update, in an automated manner, a set of key resources and venues available at different locations, providing Bayesian dependency models with sets of resources that are coupled to an ontology of activities (e.g., shopping, restaurants, recreation, government offices, schools, entertainment, . . . ). Such information can be used as a rich source of evidence in a probabilistic model that computes the likelihood of different plausible activities.

Inferences can further take into consideration the dwelling of a user at a location with zero or small velocities and the complete loss of GPS signals at particular locations for varying periods of time, indicating that a user has entered a structure the blocks receipt of GPS signals. The timing, velocity, and frank loss of signal after a slowing of velocity provide rich evidence about a user's interests or entries into different proximal buildings and structures, as characterized by the content drawn from the Web about resources in the region of the last seen GPS coordinates. Such reasoning can be enhanced by a tagged log of prior activities noted by a user. Reasoning about losses of GPS signal can take into consideration a log of known "GPS shadows," that are not associated with being inside buildings, such as those occurring inside "urban valleys," as GPS access is blocked by tall structures. Rich probabilistic models of activity and location based on multiple sources of information, including information available from the Web and from logs of prior activities and GPS availability.

FIG. 8 displays a time slice of a more general dynamic Bayesian network model, showing probabilistic dependencies among key measurements and inferences. Server icons signify access of information from the Web about local resources as well as access from a store of known GPS shadows. The model is designed to make inferences about the probability distribution over a user's activities and over the location of a user, even when GPS signals are unreliable or lost temporarily. Sub-inferences include computation about whether a user is indoors or outdoors, employing information about the loss of GPS signals, a log of GPS shadows, information about local resources to the current location, and sensed temperature.

Here, two variables 802 from an adjacent, earlier time slice are illustrated to highlight the potential value of including dependencies among variables in adjacent time slices. The variables 802 include latitude, longitude and altitude, and activity at time t−1. Such information is fed forward to an activity t. The activity t receives other information, including day of week, time of day, season, indoor versus outdoor, barometric altitude, duration a velocity zero, GPS measurement, duration when no GPS signal, and access to a Web-based location source.

The indoor versus outdoor node receives input from the time of day node, season node, a Web-based outside temperature report, a location node for (lat,long,alt) at time t, GPS shadow information, and duration when no GPS signal is received. The measured temperature node received input from the Web-base outside temperature report node, and indoor versus outdoor node. The barometric altitude node receives input from the location node and the indoor versus outdoor node. The duration velocity zero node receives input from a mean velocity node and a GPS fix node. The GPS measurement node receives input from the location node and a GPS reliability node. The GPS reliability node receives input from the GPS fix node. The GPS shadow node receives input from the location node. A GPS shadow log is provided that forms the database for all GPS shadows detected.

Knowledge of a user's raw (latitude, longitude) is not normally very useful. However, with publicly available databases, location measurements can be converted into useful information. Applications utilize raw GPS readings, and using publicly available Web data, produce useful information. The Web (or Internet), in addition to other sources of information, can be utilized to support rich probabilistic inferences about a user's activities and location. Such inferences can provide a window into a user's activities as well as access to location information even when GPS fixes become erroneous or are lost completely. Indeed, such models can take losses of GPS signal as valuable evidence for making inferences about activities and location.

Figure 9:
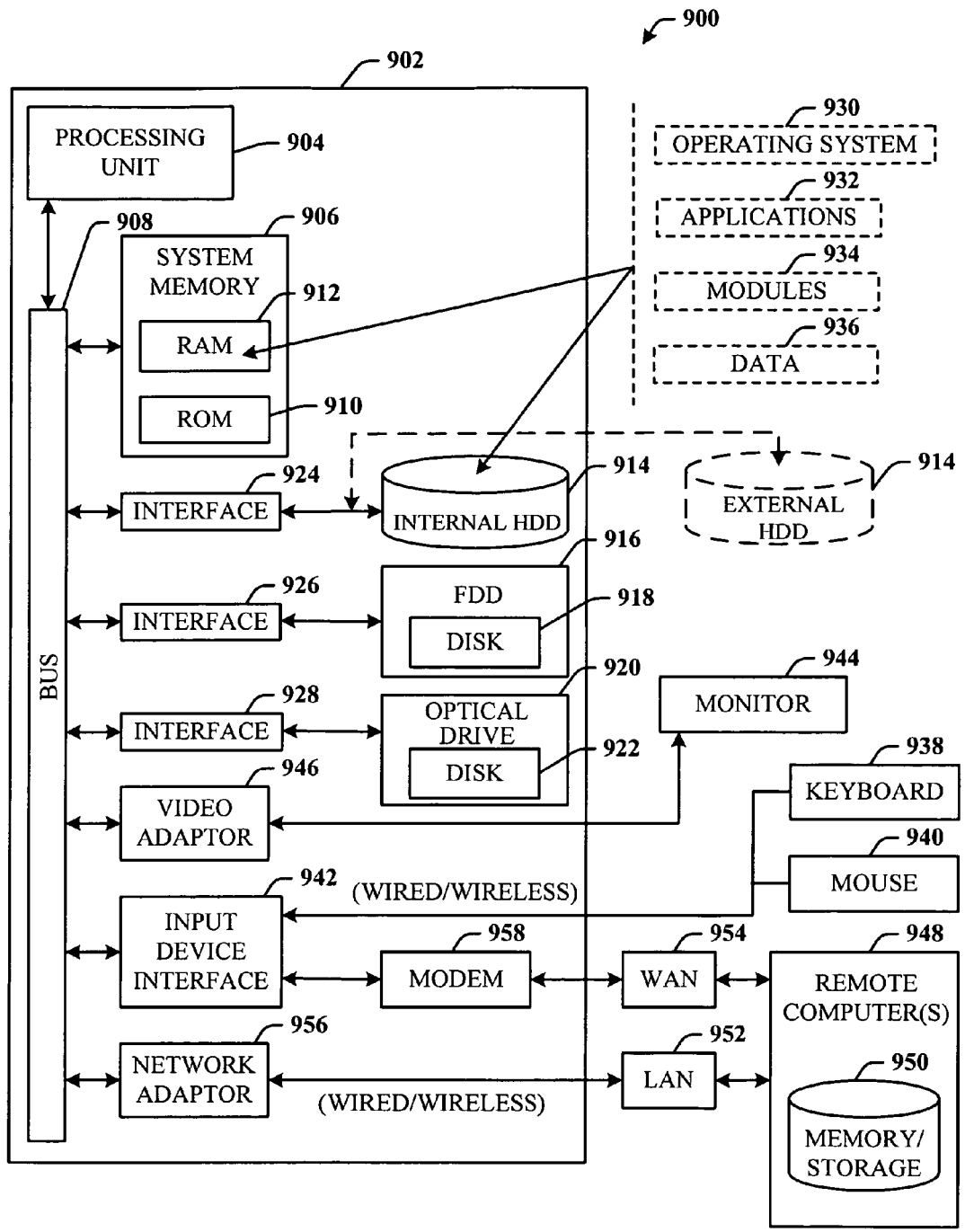
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.1a) or 54 Mbps (802.11b) data rate, for example, or with products that contain both bands (dual band), so the networks can provide real-world performance similar to the basic 10BaseT wired Ethernet networks used in many offices.

Figure 10:
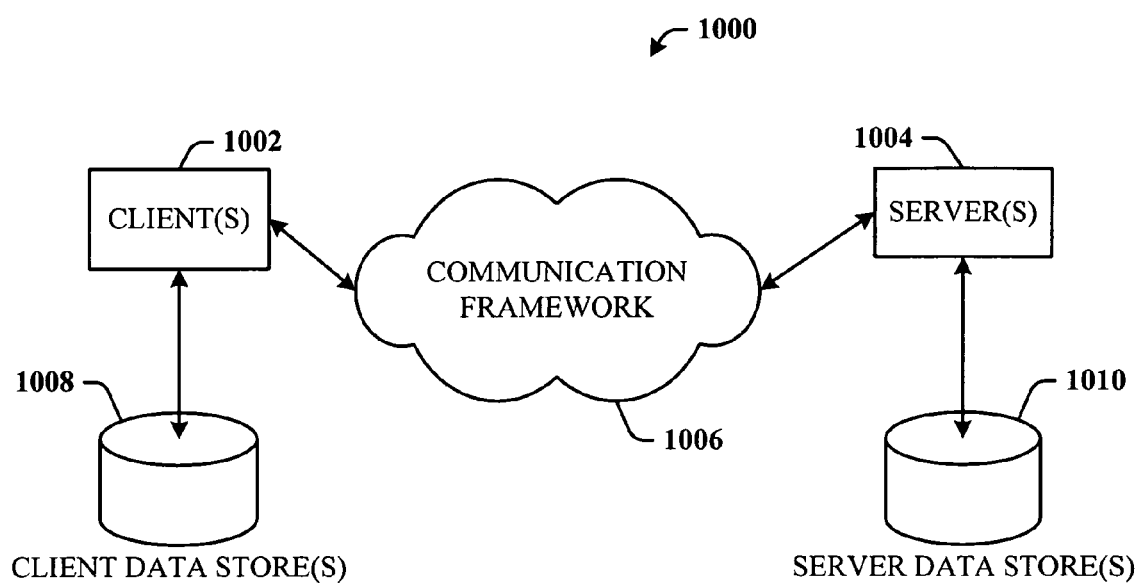
FIG. 10 illustrates a schematic block diagram of an exemplary computing environment.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates shadow mapping, comprising:
    a processing component that receives and processes location information from a plurality of wireless receiving devices that generate the location information based at least in part on GPS signals, the location information received from each wireless receiving device of the plurality of wireless receiving devices indicating locations of the wireless receiving device upon entering and exiting an area of interruption or total blockage of the GPS signals; and
    an analysis component that generates a shadow map of a communications shadow based on the location information, the shadow map representing areas of interruption or total blockage of the GPS signals, and the analysis component comprising at least one processor.

2. The system of claim 1, wherein:
    the processing component utilizes the location information, which is geographic location information, and the shadow map to compute velocity information at which a device of the plurality of wireless devices enters a shadow; and
    the velocity information is employed for reasoning about activities and context of a user of the device.

3. The system of claim 1, wherein the plurality of wireless receiving devices comprise mobile communications devices that utilizes wireless assisted GPS (WAGPS) to determine a location of an approximate border of the communications shadow.

4. The system of claim 3, wherein the plurality of wireless receiving devices comprise cellular telephones.

5. The system of claim 1, wherein the processing component receives device health data from the wireless receiving devices processes the device health data in combination with the location information to validate the location information.

6. The system of claim 1, further comprising a learning and reasoning component that employs a probabilistic and/or statistical-based analysis to prognose or infer a situation, goal, or an action that a user of a device with a GPS receiver desires to be automatically performed.

7. The system of claim 1, wherein the at least one processor comprises a processor of a server coupled to the plurality of wireless receiving devices over an IP network.

8. The system of claim 1, wherein the location information is geographic coordinates that define locations of the plurality of wireless receiving devices, and which location information changes as the wireless receiving across a boundary of the communications shadow.

9. The system of claim 1, further comprising a shadow map data store that provides access to a plurality of generated shadow maps to the plurality of wireless receiving devices.

10. A method of operating a computing system to generating a data store of shadow maps for determining context of wireless communications devices, the method comprising:
    with at least one processor:
        receiving device location data from a plurality of wireless communications devices that move in relation to a GPS shadow, the GPS shadow representing areas of interruption or total blockage of GPS signals, and the device location data from each wireless communications device indicating locations of the wireless communications device upon entering and exiting the GPS shadow;
        analyzing the device location data to determine features of the GPS shadow;
        processing the features to generate a map of the GPS shadow;
        storing the map in a data store;
        relating an organization to a location within the GPS shadow;
        inferring that a wireless communication device of the plurality of wireless communication devices has entered the organization based on a loss of GPS signal near the location; and
        inferring an activity of a user of the wireless communication device based on a type of the organization related to the location.

11. The method of claim 10, wherein:
    the device location data includes device health data that indicates a status of the wireless communications devices; and
    analyzing the device location data comprises excluding from the analysis device location data from one or more wireless communication devices for which the device health data does not indicate correct operation.

12. The method of claim 10, further comprising an act of storing the map in association with a GPS shadow-producing structure.

13. The method of claim 10, further comprising an act of processing the device location data and other data to determined speed and direction of the wireless communications device.

14. The method of claim 10, further comprising an act of inferring features of the GPS shadow based on device location data received, processed, and analyzed from a plurality of wireless communications devices, and other data accessed from other data sources.

15. The method of claim 10, further comprising an act of moving the wireless receiving device through an urban canyon of GPS shadow-producing structures to map GPS shadows associated with the structures.

16. The method of claim 10, wherein an act of receiving is via at least one of a cellular network and an IP network such that the map is stored on the data store which is on the IP network.

17. The method of claim 10, further comprising an act of mapping of the GPS shadow incrementally over time to generate a plurality of maps of the GPS shadow applicable at different times based on relative motion of the earth and one or more GPS satellites.

18. The method of claim 17, further comprising an act of combining the plurality of maps to define overall dimensions of the GPS shadow.

19. A system that generates a data store of shadow maps, comprising:
 a server comprising at least one processor implementing:
  means for receiving device data from a plurality of wireless communications devices that indicates a presence or absence of GPS signals;
  means for analyzing the presence or absence of the GPS signals to determine a location of a GPS shadow, the GPS shadow representing areas of interruption or total blockage of GPS signals;
  means for computing a dimension of the GPS shadow based on the presence or absence of the GPS signals;
  means for generating a map of the GPS shadow in relation to a shadow-producing structure; and
  means for storing the map in a data store.

20. The system of claim 19, further comprising:
 means for disabling a GPS receiver on a wireless communication device of the plurality of wireless communication devices upon entering the GPS shadow and re-enabling the GPS receiver on the wireless communication device in response to a measured acceleration of the wireless communication device that exceeds a threshold.

* * * * *

UNITED STATES PATENT AND TRADEMARK OFFICE
CERTIFICATE OF CORRECTION

| | | |
|---|---|---|
| PATENT NO. | : 7,647,171 B2 | Page 1 of 1 |
| APPLICATION NO. | : 11/171891 | |
| DATED | : January 12, 2010 | |
| INVENTOR(S) | : Eric J. Horvitz et al. | |

It is certified that error appears in the above-identified patent and that said Letters Patent is hereby corrected as shown below:

In Title page, in field (75), under "Inventors" column 1, line 1, delete "I." and insert -- J. --, therefor.

Signed and Sealed this
Twenty-second Day of February, 2011

David J. Kappos
*Director of the United States Patent and Trademark Office*